United States Patent [19]

Kagami et al.

[11] Patent Number: 5,412,637
[45] Date of Patent: May 2, 1995

[54] METHOD FOR PUTTING AN OPTICAL HEAD IN A STATIONARY STATE AND OPTICAL DISK DRIVE APPARATUS

[75] Inventors: Naoyuki Kagami, Fujisawa; Kohji Nakase, Yokohama; Hiroaki Kubo, Atsugi, all of Japan

[73] Assignee: International Business Machines Corporation, Armonk, N.Y.

[21] Appl. No.: 239,263

[22] Filed: May 6, 1994

Related U.S. Application Data

[63] Continuation of Ser. No. 47,338, Apr. 19, 1993, abandoned, which is a continuation of Ser. No. 819,734, Jan. 13, 1992, abandoned.

[30] Foreign Application Priority Data

Jan. 13, 1992 [JP] Japan .................................. 3-044575

[51] Int. Cl.[6] .............................................. G11B 7/00
[52] U.S. Cl. ............................ 369/44.32; 369/44.28; 369/32
[58] Field of Search .............. 369/32, 54, 44.27, 44.28, 369/44.29, 44.32, 43; 360/73.03, 78.08, 77.04, 78.06, 78.07

[56] References Cited

U.S. PATENT DOCUMENTS

| | | | |
|---|---|---|---|
| 4,698,796 | 10/1987 | Kimura | 369/44.28 |
| 4,835,633 | 5/1989 | Edel et al. | 360/78.04 |
| 4,955,010 | 9/1990 | Nabeshima et al. | 369/32 |
| 5,003,415 | 3/1991 | Freeze | 369/44.32 |
| 5,033,037 | 7/1991 | Yanagi | 369/44.28 |
| 5,033,039 | 7/1991 | Richgels | 369/43 |
| 5,038,333 | 8/1991 | Chow et al. | 369/44.27 |
| 5,048,001 | 9/1991 | Moriya et al. | 369/44.28 |

Primary Examiner—Georgia Y. Epps
Assistant Examiner—Nabil Hindi
Attorney, Agent, or Firm—D. A. Shifrin

[57] ABSTRACT

The present invention is intended to provide a method for putting an optical head in a stationary state, and an optical disk drive apparatus for doing so without the need of a dedicated sensor for detecting an absolute position of the optical head in the radial direction of the optical disk or a device for fixing the head.

10 Claims, 3 Drawing Sheets

METHOD FOR PUTTING AN OPTICAL HEAD IN A STATIONARY STATE AND OPTICAL DISK DRIVE APPARATUS

RELATED APPLICATION

This is a continuation of U.S. patent application Ser. No. 08/047,338, filed Apr. 19, 1993, now abandoned, which is a continuation of U.S. application Ser. No. 07/819,734, filed Jan. 13, 1992, now abandoned.

FIELD OF THE INVENTION

The present invention relates to an optical disk drive apparatus and more particularly to a method for keeping an optical head of the optical disk drive apparatus in a stationary state.

BACKGROUND OF THE INVENTION

In an optical disk drive apparatus, when the amplitude or the offset value of a Tracking Error Signal (TES) indicates a positional deviation of an optical head from a track on an optical disk, or a Focusing Error Signal (FES) indicates a deflection from a focusing state of a beam of light is corrected, the optical head may be stopped. The expression "the optical head may be stopped" as used herein does not mean that a pickup head remains put down in a certain track on the optical disk, but means that the pickup head is stopped at an absolute position in the radial direction of the optical disk. The TES is therefore generated if the optical disk rotates while the optical head stops since the optical disk and a drive apparatus to which the optical disk itself is attached, in a strict sense, are not co-axial.

The conventional optical disk apparatus may be provided with a dedicated sensor for detecting an absolute position of the optical head in the radial direction of the optical disk and controlled to stop the optical head based on a value read by the dedicated sensor. However, a problem exists in that the dedicated sensor causes the number of parts to be increased and prevents the making of a small-sized apparatus. Such a problem would occur also for the fixing of the optical head by providing means for fixing the head such as a mechanical latch mechanism, etc.

SUMMARY OF THE INVENTION

Accordingly, an object of the present invention is to provide a method for stopping an optical head and an optical disk drive apparatus in which a dedicated sensor for detecting an absolute position of the optical head in the radial direction of the optical disk or means for fixing the head are not needed.

The present invention directs attention to a fact that a stationary state is kept when forces applied to an optical head in the radial direction of a disk are balanced in a state where the optical head moves at a constant velocity. If a control value, Uo, for example a driving voltage, applied to the optical head in a state where it moves at a constant velocity, is applied to the optical head once put in a stationary state, it is equally true that forces applied to the optical head put in the stationary state are balanced. That is, the present invention is intended to obtain a control value for moving the optical head at a constant velocity in the radial direction of the optical disk to keep the optical head in a stationary state by using the control value Uo so that a TES or a FES can be corrected in a state where the optical head is stopped without the need to provide a dedicated sensor for detecting an absolute position of the pickup head in the radial direction of the optical disk or means for fixing the head. Force applied to the optical head in the radial direction of the disk includes the following components: a driving force received from means for driving the optical head (the driving force is determined by the control value); a rolling frictional force between a rail for supporting the optical head so as to make it freely movable and bearings for the pickup head; a component of gravity in the radial direction of the disk which is caused by a tilt of an optical disk drive apparatus mounted; tension of a cable attached to the optical head, and the like.

FIG. 1 shows the outline of steps in a method according to the present invention, for putting the optical head in the stationary state. In the figure, operation 1 makes the optical head movable at a constant velocity; operation 2 detects and stores a control value applied to the optical head, for example, a digital value for determining driving voltage applied to a VCM (Voice Coil Motor) for driving the optical head to keep the movement of the optical head at a constant velocity; operation 3 stops the optical head which was moving at a constant velocity and again applies the control value to the optical head to keep its stationary state; and operation 4, as required, adjusts the amplitude and the offset value of a TES detected from the optical head in the stationary state, that is, corrects the TES. The above operations are repeated, according to need, at different positions where the optical head is stopped. For example, the optical head is stopped at a predetermined position near the center of the optical disk or a predetermined position near its circumference to correct a TES. When correcting the TES, a focus error signal (FES) may be simultaneously corrected.

The foregoing and other objects, features and advantages of the invention will be apparent from the following more particular description of the preferred embodiment of the invention, as illustrated in the accompanying drawing.

DETAILED DESCRIPTION

Figure 2:
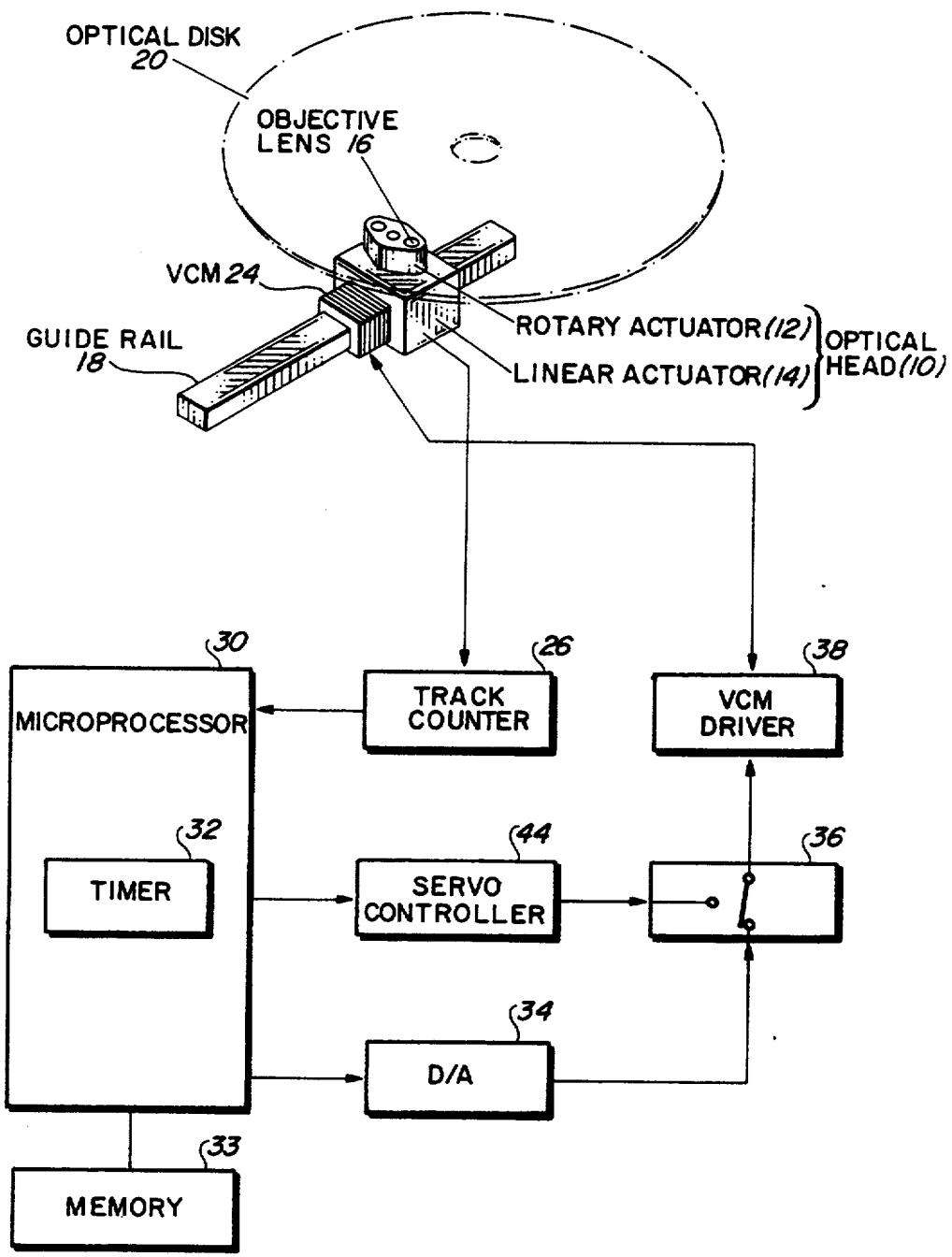
FIG. 2 is a block diagram showing the main part of an embodiment of an optical disk drive apparatus constructed in accordance with the present invention.

In the following, an embodiment of the present invention is described by reference to the drawing. FIG. 2 shows the main part of the embodiment of an optical disk drive apparatus constructed according to the present invention. Referring to FIG. 2, an optical head 10 of the optical disk drive apparatus includes a rotary actuator 12 and a linear actuator 14. The rotary actuator 12, called a fine actuator, is provided with an objective lens 16 for irradiating a laser beam on an optical disk 20 and supported by the linear actuator 14 in a state where it can be freely turned. The linear actuator 14, called a coarse actuator, can be freely moved along a guide rail 18 in the radial direction of the optical disk 20 and driven by a VCM (Voice Coil Motor) 24, which is a driving apparatus, in said radial direction.

The optical head 10 generates a Tracking Error Signal (TES). The TES indicates a deviation, relative to a track, of a spot of a laser beam irradiated by the objective lens 16 on the optical disk. The TES is sent to a track counter 26 by which the number of occurrences is counted and a result of counting is provided to a microprocessor 30. The microprocessor 30 is provided with a timer 32. The microprocessor 30 outputs a digital value, which is a control value for controlling the movement of the optical head 10, to a D/A converter 34. The digital value is retained in a memory 33 as required. An analog value outputted from the D/A converter 34 is provided, through a switch 36, to a VCM driver 38, a driving voltage or current based on said analog value being supplied to the VCM 24 by the VCM driver 38. The optical disk drive apparatus, in addition to the above, includes a servo controller 44. The servo controller 44 controls the linear actuator 14 based on a signal from a sensor (not shown) for detecting a rotational angle, relative to the linear actuator 14, of the rotary actuator 12. The servo controller 44 supplies a driving voltage or current to the VCM 24 so that the relative rotational angle becomes zero.

Figure 3:
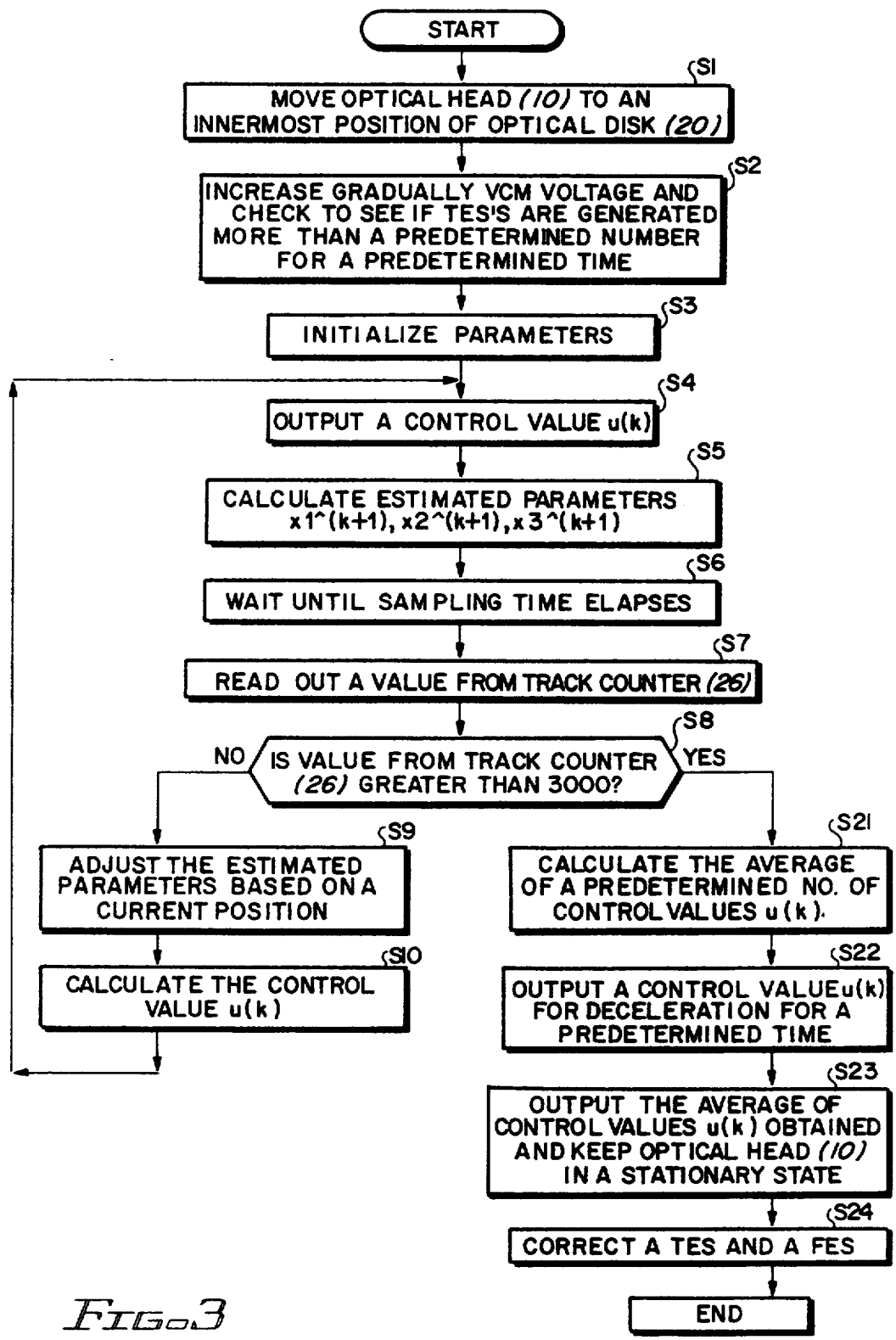
FIG. 3 is a flowchart of said embodiment.

FIG. 3 shows a flowchart of the embodiment. In the following operations, it is assumed that the switch 30 is turned to the side of the D/A converter 34. In a step S1 the optical head 10 is moved to an innermost position of the optical disk 20. The optical disk drive apparatus is usually provided with a pair of mechanism stoppers for regulating strokes of the optical head 10. The step S1 is reached when the optical head 10 moves to contact the stoppers near the inner area on the disk 20. However, if a mirror part in which track grooves do not exist is provided at the innermost positions, the optical head 10 is positioned in the mirror part.

In a step S2, the optical head 10 is moved toward the outer circumference of the disk 20 and a check is made to see if the optical head 10 starts to move. More particularly, in the step S2, the VCM voltage is slowly increased to move the optical head 10 toward the outer circumference of the optical disk 20 and detect TESs to see if the TESs have occurred more than the predetermined number of them for a predetermined time. The TESs are detected to see if the TESs have occurred more than the predetermined number of them for the predetermined time and determine if the optical head 10 moves for the reason why a TES occurs when the optical disk 20 rotates in a not co-axial state even if the optical head 10 is in a stationary state and the movement of the optical head 10, therefore, cannot be determined by only the occurring of the TES.

Figure 1:
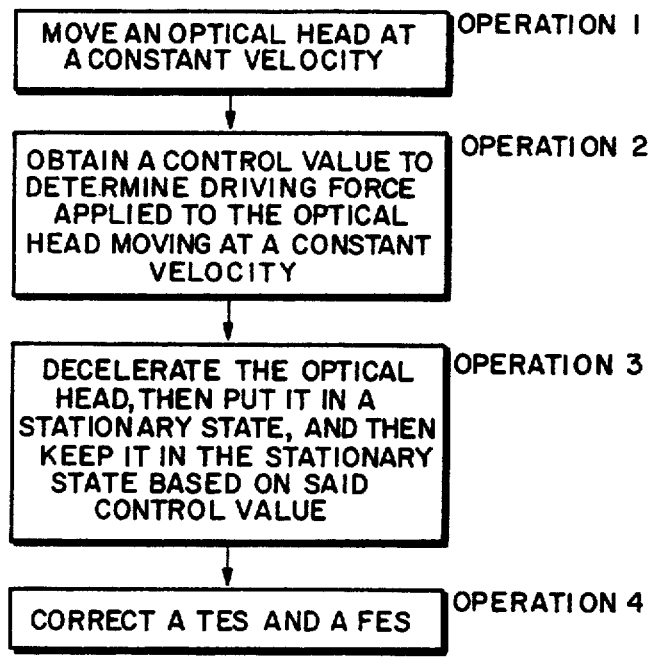
FIG. 1 is a block diagram showing an outline of how to keep an optical head at a stationary state in an optical disk drive apparatus constructed in accordance with the present invention.
Figure 4:
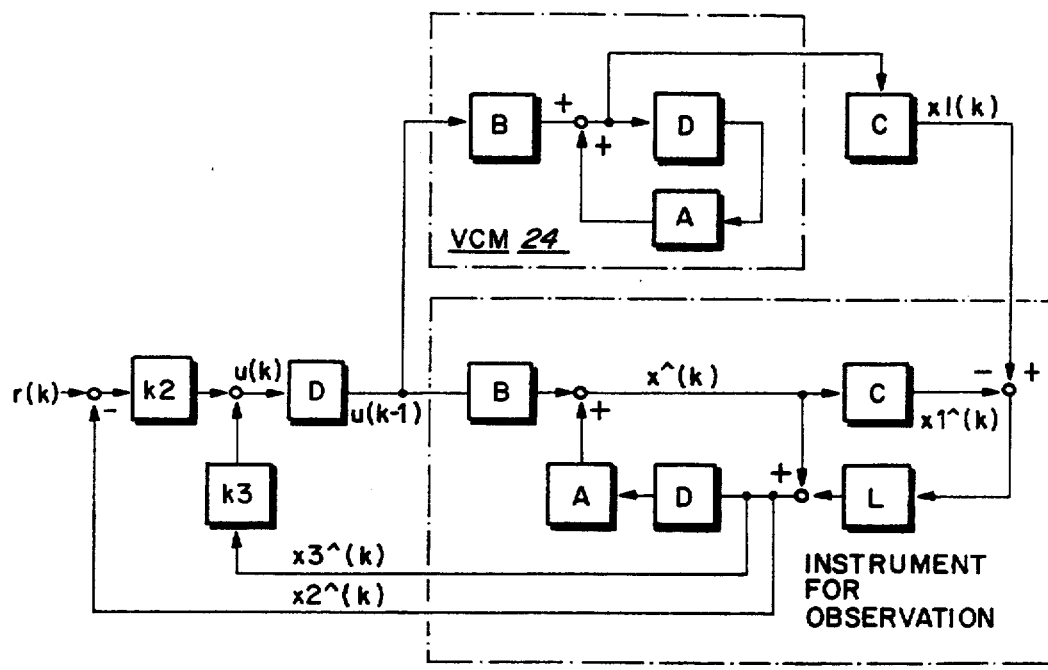
FIG. 4 is a block diagram showing the digital servo control of said embodiment.

In a step 3 and subsequent steps, the optical head 10 is under control for keeping its movement at a constant velocity. The embodiment follows digital control based on a modern control theory. According to the digital control, the optical head 10 moves at a constant velocity regardless of an initial velocity at which the optical head starts to move. First, in the step S3, all parameters are initialized, that is, reset. State variables and parameters are shown in Expression 1. A block diagram for digital servo control is shown in FIG. 4.

---
Expression 1

State variables:

| | |
|---|---|
| x1(k) | :Actual Position |
| x2(k) | :Actual velocity |
| x3(k) | :Actual external force |
| x1∼(k) | :Estimated position |
| x2∼(k) | :Estimated velocity |
| x3∼(k) | :Estimated external force |
| u(k) | :Control value |
| r(k) | :Target velocity |

$$x(k) = \begin{bmatrix} x1(k) \\ x2(k) \\ x3(k) \end{bmatrix} \qquad x\sim(k) = \begin{bmatrix} x1\sim(k) \\ x2\sim(k) \\ x3\sim(k) \end{bmatrix}$$

Parameters:

$$A = \begin{bmatrix} 1 & 1 & 1/2 \\ 0 & 1 & 1 \\ 0 & 0 & 1 \end{bmatrix} \qquad B = \begin{bmatrix} d \cdot T^2/2 \\ d \cdot T^2 \\ 0 \end{bmatrix}$$

| | |
|---|---|
| d | :System parameter |
| T | :Sampling period of time |

$$[C = 1\ 0\ 0]$$

$$L = \begin{bmatrix} l1 \\ l2 \\ l3 \end{bmatrix}$$

| | |
|---|---|
| l1,l2,l3 | :Instrumental parameters |
| k2,k3 | :State feedback parameters |
| D = One-sampling time delay | |

In a step S4, a control value u(k) is outputted, however, the step S4 is passed for the first routine since the control value u(k) is not yet estimated. In a step S5 estimated parameters are calculated. Expressions to be used in the calculation are shown in Expression 2. As is obvious from the expressions, being not only the velocity of movement, but also external force estimated, control can be stable to external disturbance such as variations in frictional force. The step S5 is passed for the first routine.

$$x1\wedge(k+1) = x1\sim(k) + x2\sim(k) + \qquad \text{Expression 2}$$
$$1/2 \cdot x3\sim(k) + d \cdot T^2/2 \cdot u(k)$$

$$x2\wedge(k+1) = x2\sim(k) + x3\sim(k) + d \cdot T^2 \cdot u(k)$$

$$x3\wedge(k+1) = x3\sim(k)$$

After the passage of a sampling time in a step S6, a value is read out from the track counter 26 in a step S7. A value read out from the track counter 26 is x1(k), which is zero for the first routine. A step S8 determines whether a value read out from the track counter 26 exceeds 3000. For movement at a constant velocity, it is considered that a distance of 3000 tracks is a necessary and sufficient condition. If a value from the track counter 26 is not greater than 3000, the operation follows a step S9 in which estimated parameters are corrected based on a current track position, that is, a value of x1(k), by using Expression 3. For the first routine, the operation starts with the step S9.

Expression 3

$$x1\sim(k) = x1\wedge(k) + l1(x1(k) - x1\wedge(k))$$

$$x2\sim(k) = x2\wedge(k) + l2(x1(k) - x1\wedge(k))$$

$$x3\sim(k) = x3\wedge(k) + l3(x1(k) - x1\wedge(k))$$

A step S10 calculates a control value u(k) by using Expression 4.

Expressions 4

$$u(k) = k2 \bullet ((r(k) - x2\sim(k) - k3 \bullet x3\sim(k))$$

The control value u(k) thus obtained is outputted back to the step S4. The routine is repeated until the step S8 determines that a moved distance of the optical head 10 exceeded 3000 tracks.

If the step S8 determines that a moved distance of the optical head 10 exceeded 3000 tracks, the operation follows a step S21. In the step S21, the average of control values u(k) obtained by the operations of the predetermined number of time immediately before the step S8 determines that a moved distance over 3000 tracks was reached, is calculated. The average can be calculated, for example, based on control values u(k) obtained at eight positions each time the optical disk 20 rotates once. The optical disk 20 usually rotating in a not co-axial state, the optical head 10 passes through tracks at a high or a low velocity depending on a not co-axial state. For the above reason, the number of recurrences of a TES (a frequency of the TES), that is, a value (x1(k)) from the track counter 26 depends on the not co-axial state of the optical disk 20. As a result, a control value u(k) calculated based on the x1(k) depends on the not co-axial state of the optical disk 20. To avoid this, the average of control values u(k) to be obtained at plural positions each time the optical disk 20 rotates once is calculated.

In a step S22, a control value u(k) for deceleration is outputted only for a predetermined time to stop the optical head 10. An absolute value of VCM voltage based on the control value for deceleration is less than that of VCM voltage generated based on the average of the control values u(k) obtained in the step S21 and the directions of both VCM voltages are opposite to each other. A time required for stopping the optical head 10 can be previously calculated. For voltage control, it is necessary to consider the back electromotive force of the VCM 24. In a step S23, the average of the control values u(k) obtained in the step S21 is outputted to keep the optical head 10 in the stationary state.

In a step S24, a TES and a FES are corrected with the optical head 10 kept in the stationary state. First, the amplitude and the offset value of the TES are adjusted to predetermined values by operating a gain amplifier and then an offset amplifier for the TES, respectively. Second, the offset value of the FES is adjusted and then the TES is corrected again.

According to the above embodiment, the optical head 10 can be kept in the stationary state without the need of a dedicated sensor for detecting an absolute position of the optical head 10 in the radial direction of the optical disk 20 or means for fixing the head. Further, according to the embodiment, the optical head 10 can be kept in the stationary state based on the control values u(k) applied to the optical head 10 for moving it at a constant velocity. This means that kinetic friction applied to the optical head 10 is under consideration to obtain high reliability. On the other hand, if the optical head 10 is kept in the stationary state based on a control value u(k) obtained at the time the optical head 10 starts to move, static friction applied to the optical head 10 is under consideration. In this case, excessive driving force is apt to be applied to the optical head.

While the invention has been particularly described with reference to particular embodiments thereof, it will be understood by those skilled in the art that various other changes in detail may be made therein without departing from the spirit, scope, and teaching of the invention. The embodiment uses a modern control theory to fulfill the movement of the optical head at a constant velocity. However, it will be appreciated that the movement of the optical head at a constant velocity can be accomplished by using a method other than the modern control theory, in which the number of recurrences of a TES can be a value within a certain range. In said embodiment, external forces to be applied to the optical head 10 are estimated. However, it will be appreciated that the external forces do not always need to be estimated. It will be appreciated also that if the external forces are estimated to be used, stable control can be accomplished even though external disturbance causes due to variation in frictional forces. It will be appreciated also that an object of keeping the optical head 10 in the stationary state is not restricted to the correction of a TES or a FES.

Accordingly, the invention herein disclosed is to be limited only as specified in the following claims.

What is claimed is:

1. A method for obtaining a control value during a seek operation and applying the control value to place and maintain an optical head of an optical disk drive apparatus in a stationary state, comprising machine-executed steps of:

applying a velocity signal to a drive means, the velocity signal representative of a first force required to move said optical head at a constant velocity in the absence of external second forces acting on said optical head;

obtaining a control value representative of a third force required to supplement the first force to maintain movement of said optical head at the constant velocity in the radial direction of an optical disk despite the presence of the external second forces of said step of obtaining a control value comprising the steps of:

detecting positional information on said optical head at a predetermined interval;

estimating a velocity of said optical head based on the detected positional information;

calculating said control value based upon a predetermined constant value and the positional information; and applying said velocity signal and said control value to said drive means so that the estimated velocity converges to the predetermined constant value; placing said optical head in a stationary state; and applying said control value to maintain said optical head in the stationary state despite the presence of the external second forces.

2. The method according to claim 1, wherein said step of obtaining said control value comprises machine-executed steps of estimating the external second forces acting on said optical head, a velocity of said optical head, and a head position based on current detected positional information, a preceding detected positional information and a preceding calculated revised control value.

3. A method for obtaining a control value during a seek operation and applying the control value to place and maintain an optical head of an optical disk drive apparatus in a stationary state, comprising machine-executed steps of:

applying a velocity signal to a drive means, the velocity signal representative of a first force required to move said optical head at a constant velocity in the absence of external second forces acting on said optical head;

obtaining a predetermined number of control values while said optical head moves at a constant velocity, said control values representative of a third force required to supplement the first force to maintain movement of said optical head at the constant velocity in the radial direction of an optical disk despite the presence of the external second forces;

averaging said predetermined number of control values; and after said optical head is placed in the stationary state, applying the average of the control values to said drive means to maintain said optical head in the stationary state despite the presence of the external second forces.

4. The method according to claims 3, wherein said predetermined number of control values are obtained at plural positions of said optical head while said optical disk rotates once.

5. The method according to claim 4 wherein said control values are referred to as driving voltages or said drive currents supplied to driving means for said optical head.

6. A method for obtaining a control value during a seek operation and applying the control value to place and maintain an optical head of an optical disk drive apparatus in a stationary state, said optical disk drive apparatus having an optical disk loaded therein, comprising machine-executed steps of:

moving said optical head toward a first predetermined position of said optical disk;

increasing a voice coil motor voltage and checking a number of tracking error signals generated in a predetermined time, while said head is moved toward the first predetermined position;

estimating a position, a velocity, and an external force of said optical head, while said head is moved toward the first predetermined position;

reading a track counter to determine an actual position of said optical head, while said head is moved toward the first predetermined position;

adjusting the position, velocity, and external force estimates based on the actual position, while said head is moved toward the first predetermined position;

determining a control value based on the adjusted position, velocity and external force estimates, said control value being representative of a force required to substantially maintain movement of said optical head at a constant velocity despite the presence of external forces, while said head is moved toward the first predetermined position;

repeating the estimating, reading, adjusting and determining steps until said actual position coincides with a second predetermined position, while said head is moved toward the first predetermined position;

averaging a predetermined number of determined control values; and applying the average of determined control values to the voice coil motor to substantially maintain said optical head in a stationary state despite the presence of the external forces.

7. The method according to claim 6 wherein said first predetermined position of said optical head is at an innermost position of said optical disk.

8. The method according to claim 7 wherein said second the predetermined actual position is greater than a track 3000 of said optical disk.

9. The method according to claim 6 further comprising the machine-executed step of correcting the tracking error signal and a focussing error signal.

10. An optical disk drive apparatus for obtaining a control value during a seek operation and applying the control value to place and maintain an optical head in a stationary position without using a position sensor, said optical disk apparatus having an optical disk loaded therein at a predetermined position, an optical head for applying a laser beam to the optical disk, guide means for guiding the optical head in the radial direction of the optical disk, and drive means for driving the optical head, said optical disk drive apparatus comprising:

a track counter, responsive to a tracking error signal, for determining a radial position of said optical head;

a processor means coupled to said track counter and to said drive means for calculating an average control value while said optical head is in motion in the radial direction of the optical disk based upon adjusted position, velocity and external force estimates, said average control value being representative of a force required to substantially and maintain movement of said optical head at a constant velocity despite the presence of external forces acting upon said optical head, said average control value to be applied to said drive means to move said optical head at a constant velocity in the radial direction of the optical disk despite the presence of the external forces; and a voice coil motor driver for applying the average control value to said drive means, wherein, when said optical head is in a stationary state, said processor means applies said average control value to said drive means to maintain said optical head in the stationary state despite the presence of the external forces.

* * * * *

UNITED STATES PATENT AND TRADEMARK OFFICE
CERTIFICATE OF CORRECTION

PATENT NO. : 5,412,637
DATED : May 2, 1995
INVENTOR(S) : Kagami, et al.

It is certified that error appears in the above-identified patent and that said Letters Patent is hereby corrected as shown below:

In Abstract, Line 3, insert -- , -- after "for doing so".

At column 4, Line 68, insert -- ^ -- in equation, to read
$x3\sim(k) = x3^{\ominus}(k) + 13 (x1(k) - x1^{\ominus}(k))$ At column 8, line 18, delete the word "the" after "second".

Signed and Sealed this

Twenty-fifth Day of July, 1995

Attest:

BRUCE LEHMAN

Attesting Officer     Commissioner of Patents and Trademarks